United States Patent
Kuo et al.

(10) Patent No.: US 7,272,266 B2
(45) Date of Patent: Sep. 18, 2007

(54) METHOD FOR RESTORING FADED PHOTOGRAPHS AND FILM

(75) Inventors: Ming-Huang Kuo, Taipei Hsien (TW); I-Chen Teng, Taipei Hsien (TW)

(73) Assignee: BenQ Corporation, Gueishan, Tao-Yuan Hsien (TW)

( * ) Notice: Subject to any disclaimer, the term of this patent is extended or adjusted under 35 U.S.C. 154(b) by 862 days.

(21) Appl. No.: 10/605,463

(22) Filed: Sep. 30, 2003

(65) Prior Publication Data

US 2005/0078878 A1    Apr. 14, 2005

(51) Int. Cl.
*G06K 9/40* (2006.01)
(52) U.S. Cl. .............. 382/274; 382/164; 382/167; 382/275; 358/518; 358/520
(58) Field of Classification Search .............. 382/164, 382/167, 274, 275; 358/515, 518, 520
See application file for complete search history.

(56) References Cited

U.S. PATENT DOCUMENTS

| | | | | |
|---|---|---|---|---|
| 5,267,031 A | * | 11/1993 | Katoh et al. | 358/527 |
| 5,874,988 A | * | 2/1999 | Gu | 348/97 |
| 6,636,646 B1 | * | 10/2003 | Gindele | 382/274 |
| 6,640,000 B1 | * | 10/2003 | Fey et al. | 382/128 |
| 6,850,259 B1 | * | 2/2005 | Rzepkowski et al. | 715/835 |

* cited by examiner

*Primary Examiner*—Yosef Kassa
(74) *Attorney, Agent, or Firm*—Winston Hsu (57) ABSTRACT

A method for correcting faded colors in aged photographs or film. The method automatically restores the color of the image by analyzing the color variance in the image and determining tonal curve for each channel. First, the interior of the image is selected and the image is portioned into sub-images. The variance of each sub-image is calculated, and the parameters are evaluated for correcting the entire image during scanning. This method will provide good color quality and preserve good density of the image.

9 Claims, 7 Drawing Sheets

METHOD FOR RESTORING FADED PHOTOGRAPHS AND FILM

BACKGROUND OF INVENTION

1. Field of the Invention

The present invention relates to a color restoration method, and more specifically, to a method for restoring faded pictures or film.

2. Description of the Prior Art

Almost everyone has old photographs of their parents, their grandparents, or of their childhood. When it comes to aging, photos fade in many different ways. In general, the aged photos often take a yellowish color, and the negatives also tend to have a reddish tone with time. As there are various considerable causes of fading, precious color photographic originals should be kept under safe conditions whenever possible. Keeping photographs and film in dark places with a low temperature and low moisture can help slow the effects of aging, but cannot entirely prevent them.

SUMMARY OF INVENTION

It is therefore a primary objective of the claimed invention to provide a method for restoring aged photographs and film in order to solve the above-mentioned problems.

According to the claimed invention, a method for restoring color of an image includes reading an original image and performing a white point balancing process on the original image. The method also includes segmenting the white point balanced image into a plurality of sub-images, sampling each sub-image to obtain color channel data for each sub-image, selecting sub-images with a highest standard deviation of color channel data, and analyzing the selected sub-images to calculate a composite color channel mean for each color channel of the white point balanced image. For correcting the color of the image, the method also includes selecting a first color channel with a highest composite color channel mean, a second color channel with an intermediate composite color channel mean, and a third color channel with a lowest composite color channel mean, applying a power function on the first and third color channels of the white point balanced image to approximately equalize the color channel means of the first, second, and third color channels, and outputting a restored image.

It is an advantage of the claimed invention that the means of all color channels are approximately equalized for balancing colors of the image, providing good color quality, and preserving good density of the image.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
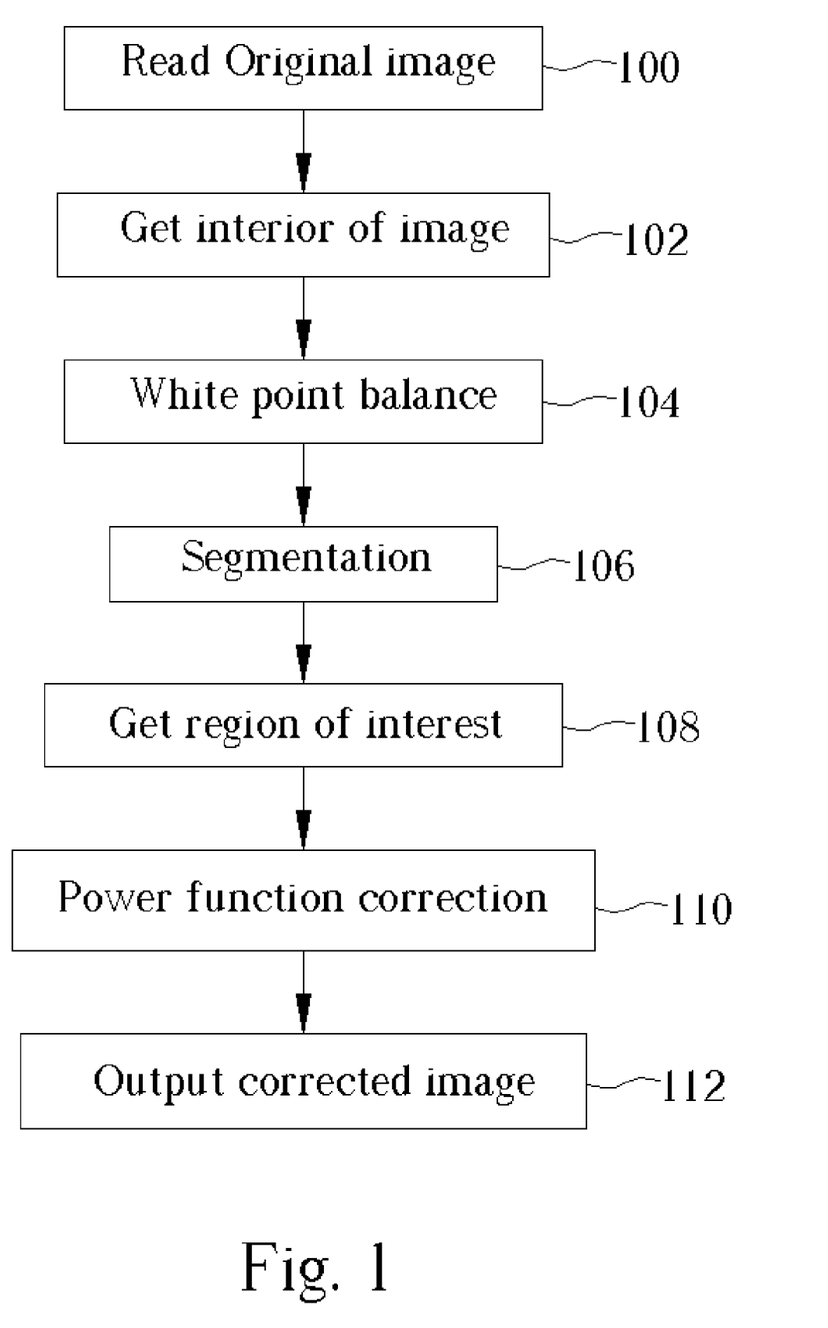
FIG. 1 is a flowchart summarizing the present invention method of restoring color of an image.
Figure 2:
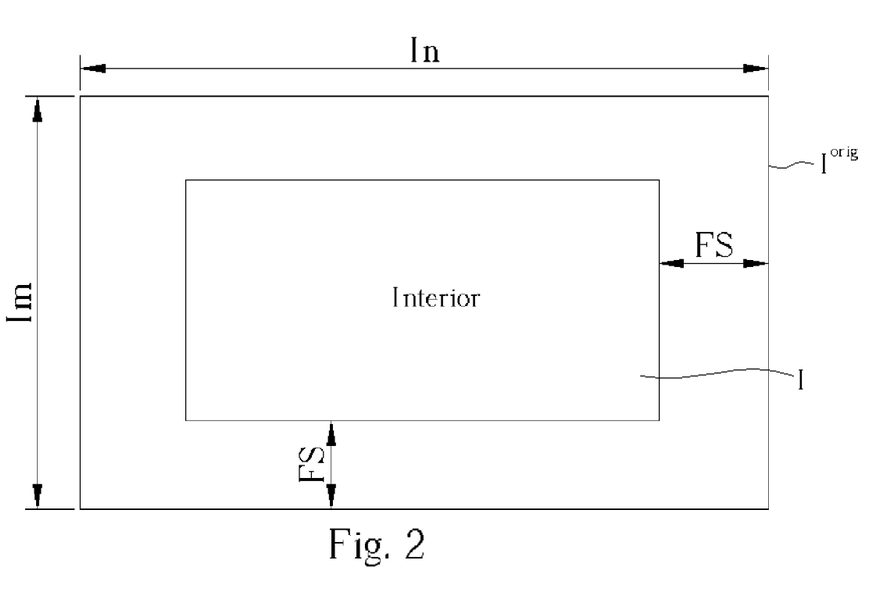
FIG. 2 shows an original image to be restored.

Please refer to FIG. 1 and FIG. 2. FIG. 1 is a flowchart summarizing the present invention method of restoring color of an image. FIG. 2 shows an original image $I^{orig}$ to be restored. In step 100 of the flowchart shown in FIG. 1, the original image $I^{orig}$ is read. The original image $I^{orig}$ may be a photograph or film. First, an outside border of the original image $I^{orig}$ is ignored in step 102 since the border may not contain any image data. Therefore, only an interior image I is used in the color restoration process of the present invention. Next, a white point balancing process is performed in step 104. The interior image I is then split into a plurality of sub-images in step 106. Sub-images with greatest color variance are selected in step 108, and are referred to as a region of interest. A mean for each color channel (such as red, green, and blue) is then calculated, and the means for respective color channels are compared with each other. The three color channels are sorted according to the value of their means. A proper power function is then determined in step 110 for correcting the color channels with the highest and lowest means. In step 112, the power function is then applied to the entire image, thereby causing all three color channels to have an approximately equal mean and restoring the color quality of the original image $I^{orig}$.

A detailed description of the present invention method will now be described. First of all, the size of the original image $I^{orig}$ is calculated, and $I^{orig}$ has $I_m^{orig}$ rows and $I_n^{orig}$ columns. Next, as shown in FIG. 2, a frame size FS is calculated around a border of the original image $I^{orig}$, such that $$FS = [\min(I_m^{orig}, I_n^{orig})/IFR],$$

were IFR is the Image-Frame Ratio. The interior section of the original image $I^{orig}$ is referred to as an interior image I, which is formed by removing FS pixels from each side of the image $I^{orig}$. The interior image I has $I_m$ rows and $I_n$ columns. Then a histogram of each channel of I is calculated. The histogram $H_R$ for the R channel, for example, is computed such that $H_R=\{h_i\}$, where $h_i=\#(\{p|p=i, p \text{ is the pixel value in R channel}\})$, and $\#(.)$ is the counting measure from set to $\Re(\text{or } R)$. If $I_m I_n$ is too large, sample pixels can be taken from the interior image I instead. A histogram will be calculated for each channel R, G, and B. Since the histogram H is computed in the same way for each channel, it will only be explained once.

Figure 3:
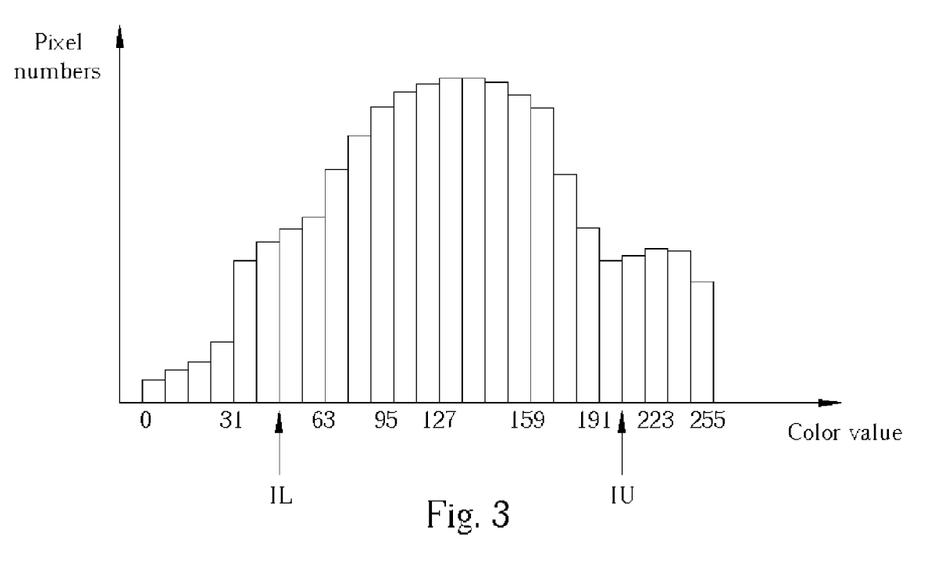
FIG. 3 is a histogram of color channel data for the present invention.

Please refer to FIG. 3. FIG. 3 is a histogram of color channel data for the present invention. The histogram in FIG. 3 shows the number of pixels in the image I having a certain color value. As an example, the histogram shown in FIG. 3 assumes 8-bit color is used, and the color values can range from 0 to 255. Next, a lower bound IL and an upper bound IU are calculated for the interior image I. The lower and upper bounds IL and IU are calculated according to a predetermined fraction c of pixels in the image I (for example, the fraction c may have a value of 0.05). For each channel, $$IL = \sup\left\{n \,\middle|\, \sum_{i=0}^{n} h_i < cI_m I_n\right\}$$

and $$IU = \inf\left\{n \,\middle|\, \sum_{i=0}^{n} h_i > (1-c)I_m I_n\right\},$$

where c is a fixed number between 0 and 1, and $h_i$ is the number of pixels for a given color value.

Figure 4:
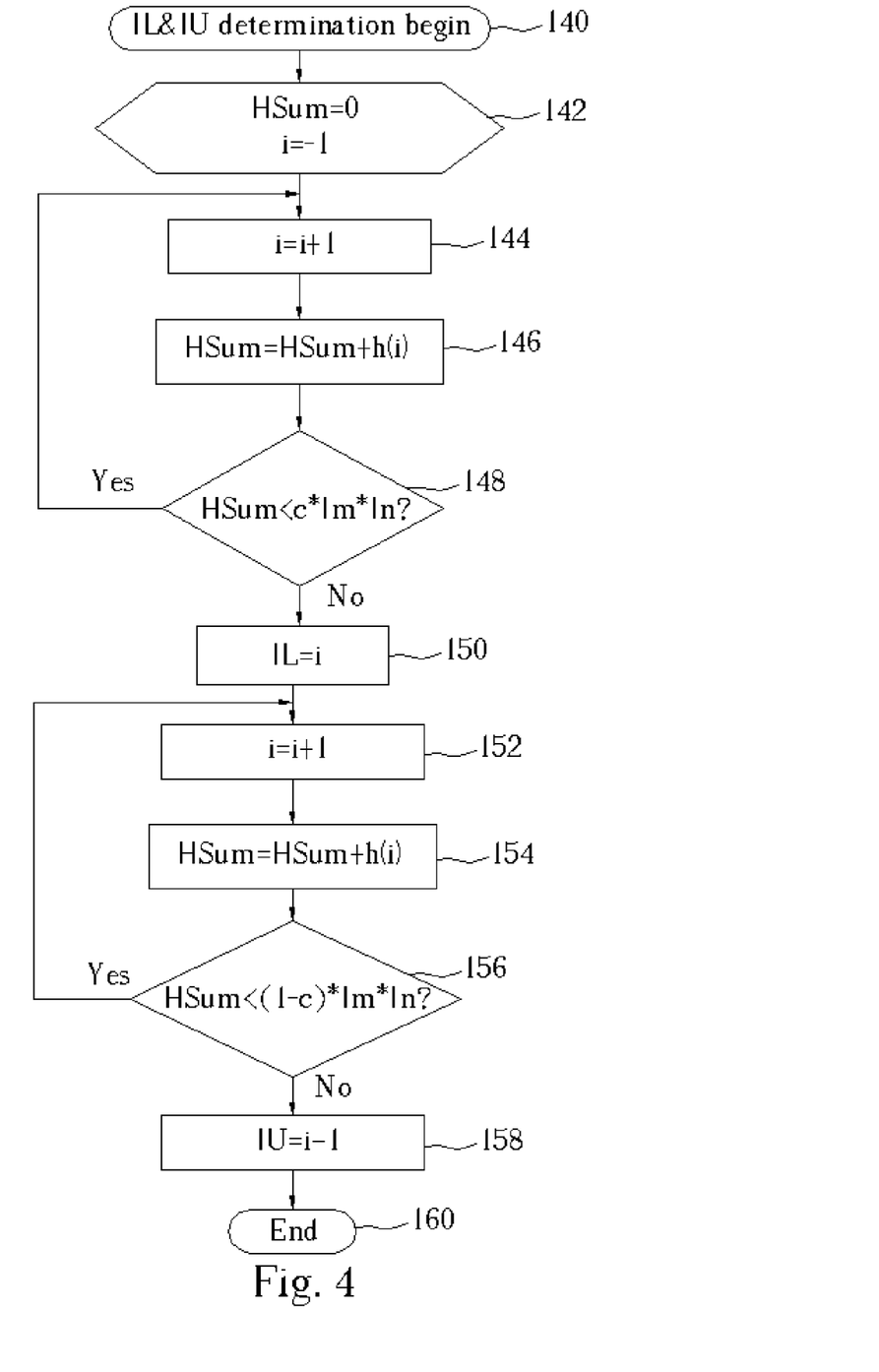
FIG. 4 illustrates an algorithm for calculating the lower bound and upper bound for each color channel.

Please refer to FIG. 4. FIG. 4 illustrates an algorithm for calculating the lower bound IL and upper bound IU for each color channel. The algorithm begins in step 140, and variables are initialized in step 142. The variable HSum is used to calculate a total sum of pixels in the histogram, and i is a counter variable for indicating the color value. In steps 144 and 146, the i counter is incremented and the value of h(i) is added to HSum. According to step 148, steps 144 and 146 are repeated until HSum is greater than or equal to $c*I_m*I_n$. Once HSum is greater than or equal to $c*I_m*I_n$, the value of the lower bound IL is set equal to the current value of i in step 150. To calculate the upper bound IU, the i counter is incremented and the value of h(i) is added to HSum in steps 152 and 154. According to step 156, steps 152 and 154 are repeated until HSum is greater than or equal to $(1-c)*I_m*I_n$. Once HSum is greater than or equal to $(1-c)*I_m*I_n$, the value of the upper bound IU is set equal to the current value of i−1 in step 158. Once the lower bound IL and the upper bound IU are calculated, the algorithm is ended in step 160.

After the lower bound IL and the upper bound IU have been calculated, a white point balancing process is performed. In this process, the color value of each pixel pix of the considered channel will be replaced by:

$$pix = \begin{cases} OU & \text{if } pix \geq IU \\ OL + (OU - OL)(pix - IL)/(IU - IL) & \text{if } IL \leq pix \leq IU \\ OL & \text{if } pix \geq IL \end{cases}$$

Figure 5:
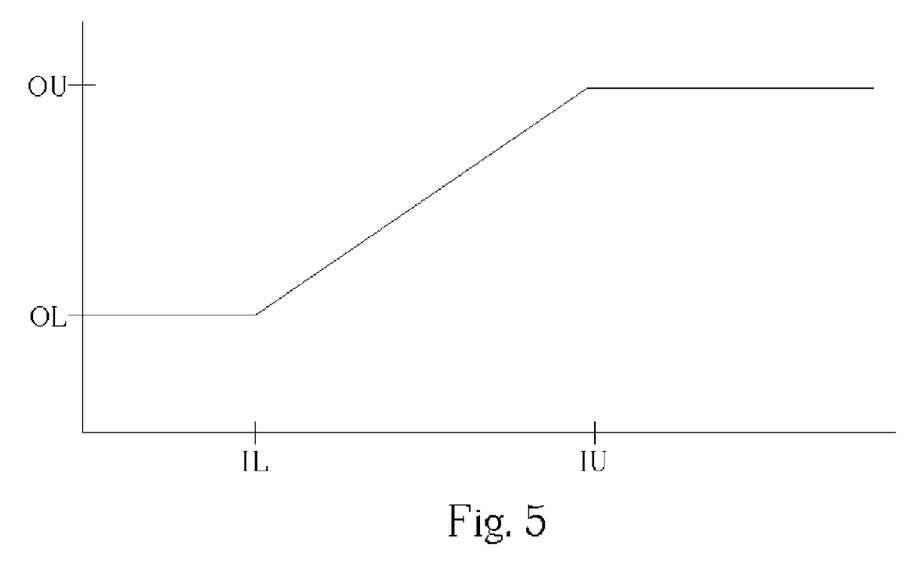
FIG. 5 illustrates the effects of a white point balancing process.
Figure 6:
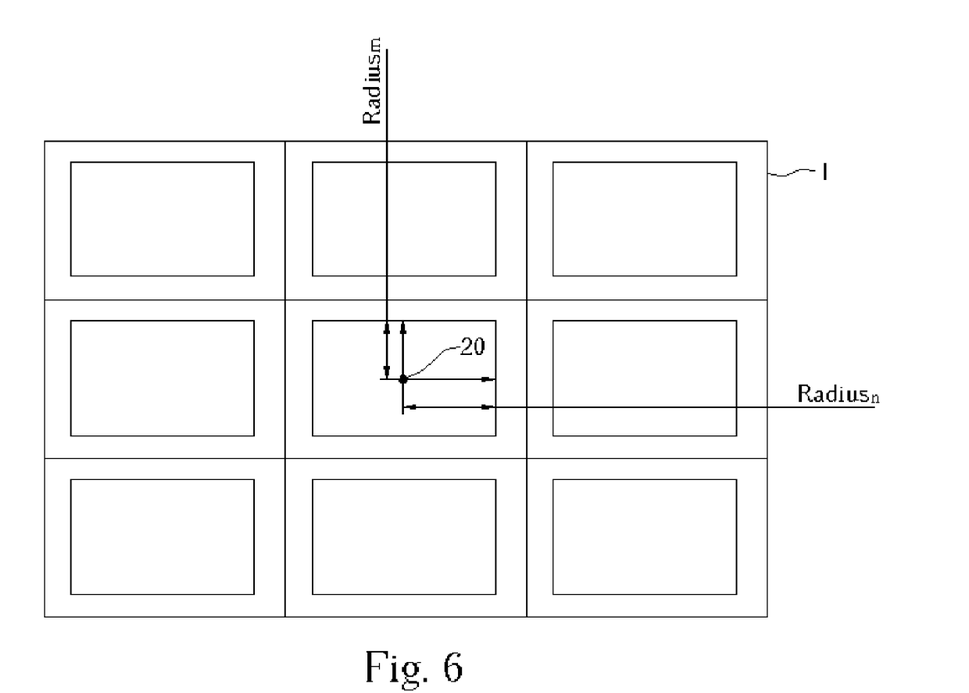
FIG. 6 is a diagram of an image being segmented into sub-images according to the present invention.

The effects of the white point balancing process as illustrated in FIG. 5. The output lower bound OL and output upper bound OU are defined in terms of the input lower bound IL and the input upper bound IU. After the white point balancing process has been performed, the image I is segmented into mn sub-images. Each of the sub-images is referred to as sub-image $I_{ij}$, where $0 \leq i \leq m$ and $0 \leq j \leq n$. Please refer to FIG. 6. FIG. 6 is a diagram of image I being segmented into sub-images $I_{ij}$ according to the present invention. The center of each sub-image $I_{ij}$ has a centerindicated by point 20 on FIG. 6, which has the coordinates $(idx_m, idx_n)$. A top-left corner of each sub-image $I_{ij}$ is located at the point $(idx_m - radius_m, idx_n - radius_n)$ and a lower-right corner is located at the point $(idx_m + radius_m, idx_n + radius_n)$, where $idx_m = [(i-1)I_m/m]$ and $idx_n = [(j-1)I_n/n]$.

Figure 7:
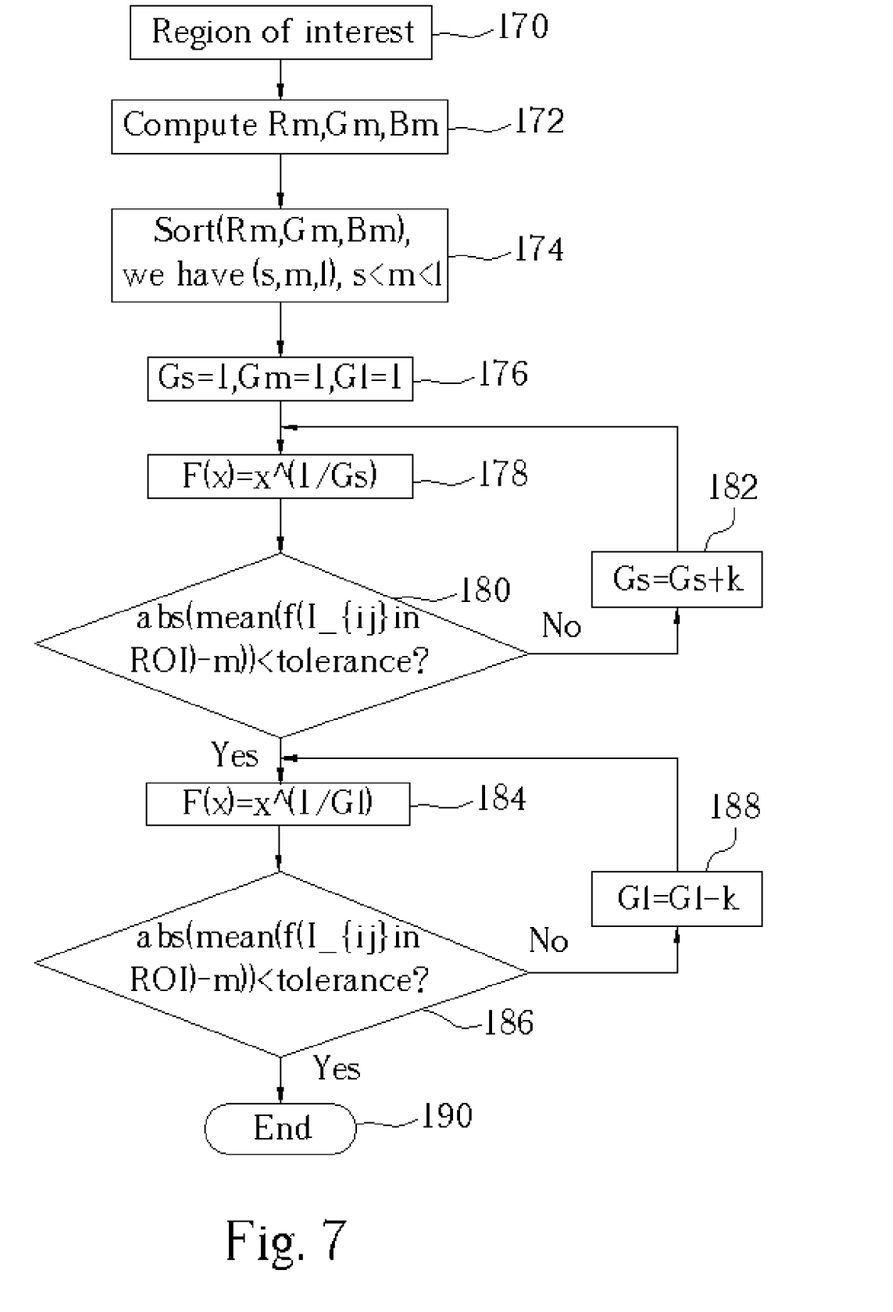
FIG. 7 is a flowchart illustrating the color correction method of the present invention.

Please refer to FIG. 7. FIG. 7 is a flowchart illustrating the color correction method of the present invention. After generating the sub-images $I_{ij}$, a histogram $H_{ij}$ is calculated for each generated for each sub-image $I_{ij}$. Utilizing the histograms $H_{ij}$, a mean $M_{ij}$ and standard deviation $S_{ij}$ are calculated. Alternatively, the means $M_{ij}$ and standard deviations $S_{ij}$ can also be calculated directly from $I_{ij}$. Once the standard deviations $S_{ij}$ are calculated, the standard deviations $S_{ij}$ are rearranged as a decreasing sequence $S_k$, thereby forming set $T=\{(i,j,k)|S_{k+1} \leq S_k, S_k = S_{ij}$ for all i,j$\}$. Then, a cutoff point p is defined as $p = [c1 \cdot \#(T)]$ with $0 < c1 < 1$. The elements in the decreasing sequence $S_k$ greater than the cutoff point p are then selected to be in a set ROI=$\{I_{ij}|(i,j,k)$ in $T, S_k > p\}$. That is, the set ROI contains the higher standard deviations $S_{ij}$, and is referred to as the region of interest in step 170 of the flowchart in FIG. 7. Using the set ROI, the mean of $\{I_{ij}|I_{ij}$ inROI$\}$ is computed for each channel, which will respectively be referred to as $R_m, G_m, B_m$ for the red, green, and blue channels (step 172). Next, the means $R_m, G_m, B_m$ will be sorted in increasing order in step 174, and labeled as values (s,m,l), without loss of generality, we assume $s = R_m$, $m = G_m$, $l = B_m$. In step 176, exponents $g_s$, $g_m$, and $g_l$ corresponding to the labels s, m, and l are all initialized to a value of 1. For the R channel, the mean $R_m$ is less than the mean $G_m$. To equalize the means $R_m$ and $G_m$, a power function $f(x) = x^{1/Gs}$ is applied to the corresponding ROI set of the R channel in step 178, where $g_s > 1$. The value of $g_s$ is repeatedly incremented by a small fixed amount k (such as 0.1 or less) in step 182 until the relationship abs(mean($f(I_{ij}$ in ROI))−m)<tolerance is satisfied in step 180. Once this relationship is satisfied, the means $R_m$ and $G_m$ are approximately equalized. In steps, 184, 186, and 188, the same process is repeated for equalizing means $B_m$ and $G_m$. The only difference is the value of $g_l$ is repeatedly decremented by the small fixed amount k so that $g_l < 1$. After these values of $g_s$ and $g_l$ have been calculated using the set ROI, the power function $f(x) = x^{1/G}$ is applied to the R, G, and B color channels of the entire image I for equalizing the R, G, and B color channels.

In contrast to the prior art, the present invention method equalizes color channel levels to provide good color quality and preserve good density of the image. If a photograph is being restored, the corrected image will no longer have a yellowish tint. If film is being restored, the corrected image will no longer have a reddish tint. Therefore, the present invention method provides a way to restore aged photographs and film through a simple mathematical algorithm.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of restoring color of an image, the method comprising:
   (a) reading an original image;
   (b) performing a white point balancing process on each color channel of the original image;
   (c) segmenting the white point balanced image into a plurality of sub-images;
   (d) sampling each sub-image to obtain color channel data for each sub-image;
   (e) selecting sub-images with a higher standard deviation of color channel data;
   (f) analyzing the selected sub-images to calculate a composite color channel mean for each color channel of the white point balanced image;
   (g) selecting a first color channel with a highest composite color channel mean, a second color channel with an intermediate composite color channel mean, and a third color channel with a lowest composite color channel mean;

(h) applying a power function on the first and third color channels of all sub-images of the white point balanced image to approximately equalize the color channel means of the first, second, and third color channels; and (i) outputting a restored image.

2. The method of claim 1 wherein step (a) further comprises:

(a1) calculating dimensions of the original image; and (a2) reading an interior section of the original image to ignore an outside border of the original image.

3. The method of claim 1 wherein step (b) further comprises:

(b1) generating a histogram for each color channel of the original image;

(b2) calculating a lower bound and an upper bound based on the histogram corresponding to each color channel of the original image; and (b3) performing a linear interpolation function to shift a color channel value of each pixel of the original image to be within an interval defined by the lower and upper bounds for each color channel.

4. The method of claim 1 wherein step (c) comprises segmenting the white point balanced image into a plurality of sub-images $I_{ij}$.

5. The method of claim 4 wherein step (e) comprises (e1) calculating a standard deviation $S_{ij}$ of each sub-image $I_{ij}$;

(e2) sorting the standard deviation values $S_{ij}$ into a decreasing sequence $S_k$ to form a set $$T=\{(i,j,k)|S_{k+1} \leq S_k S_k = S_{ij} \text{ for all } i,j\};$$

and (e3) selecting a subset of sub-images ROI, wherein set $p=[c\cdot 3(T)]$, c is a fixed value such that $0<c<3$, and $$ROI=\{I_{ij}|(i,j,k) \text{ in } T, S_k > p\}.$$

6. The method of claim 5 wherein step (e1) further comprises computing a histogram $H_{ij}$ of each sub-image $I_{ij}$ and using the histogram $H_{ij}$ to calculate the standard deviation $S_{ij}$ of each sub-image $I_{ij}$.

7. The method of claim 5 wherein step (f) further comprises computing a mean of $$\{I_{ij}|I_{ij} \text{ in ROI}\}$$

for each color channel.

8. The method of claim 1 wherein in step (h), the power function applied to the first and third color channels is of form $f(x)=x^{1/g}$, wherein x represents color channel data and g is a constant which needs to be determined.

9. The method of claim 1 wherein the color channels correspond to red, green, and blue colors.

* * * * *